Aug. 25, 1936.   A. J. S. BROWN   2,052,078

CARBON PILE REGULATOR

Filed Oct. 4, 1934

Inventor
Arthur J. S. Brown
By Sommers & Young
Attys.

Patented Aug. 25, 1936

2,052,078

UNITED STATES PATENT OFFICE 2,052,078

CARBON PILE REGULATOR

Arthur James Stephen Brown, Bromley, England, assignor to J. Stone & Company Limited, Deptford, England, a corporation of Great Britain Application October 4, 1934, Serial No. 746,897

3 Claims. (Cl. 171—229)

This invention concerns improvements in and relating to electro-magnetic carbon pile regulators and has for its principal object to provide a form of carbon pile regulator which is more especially suitable for use as a main regulator controlled by a pilot regulator, for example for lamp voltage regulation purposes in electrical train lighting installations. Desiderata for a main regulator so controlled are that it should be simple and inexpensive to manufacture, robust in construction and reliable and constant in operation without the necessity for expert maintenance and adjustment.

Although other forms of regulator may be preferred where different considerations carry greater weight, the above desiderata can be well satisfied with a carbon pile regulator having a clapper or flap-type armature. It is a further object of the invention to provide an improved regulator of this kind which is especially suitable for the aforesaid purpose.

Figure 1:
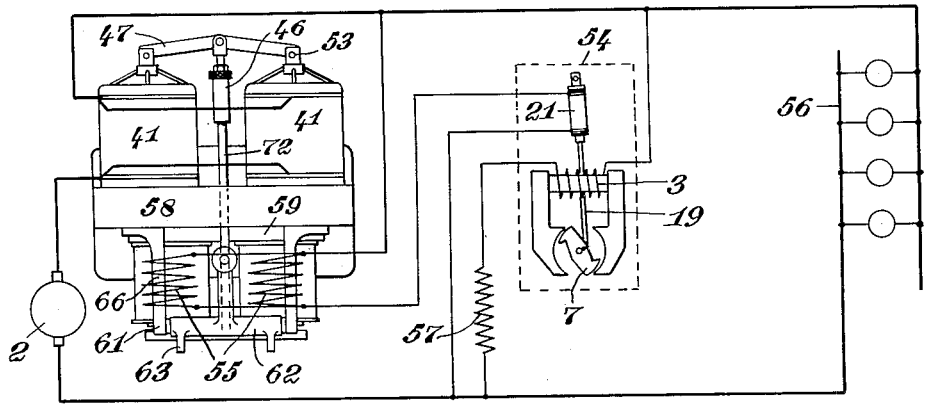
Figure 2:
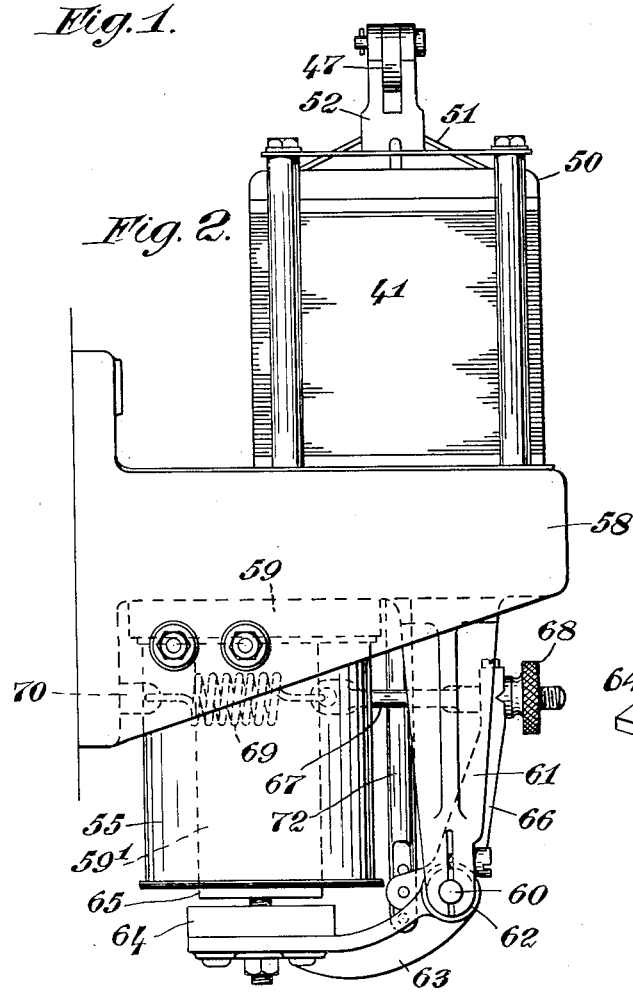
Figure 3:
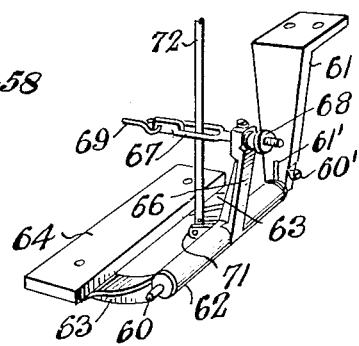

One embodiment of the invention as devised more especially for lamp voltage regulation in train lighting installations will now be described by way of example and with reference to the accompanying drawing, in which:

Figure 1 illustrates the main regulator in front elevation and at the same time shows the pilot regulator and circuit arrangement diagrammatically, Figure 2 is a side elevation to a larger scale of the main regulator alone, and Figure 3 is a perspective view of the lever system of the regulator of Figure 2.

Referring first of all to Figure 1, the pilot regulator is illustrated diagrammatically at 54. This pilot regulator may suitably be a regulator such as is described in the specification of the patent application of Alfred H. Chilton, Serial No. 683,557, filed August 3, 1933, or the specification of the United States patent to Alfred H. Chilton, No. 1,963,825, dated June 19, 1934, with the difference that attraction of the rotor 7 compresses the carbon pile 21 by means of the push rod 19. The pile 21 is connected, in series with the exciting windings 55 of the principal regulator, across the lamp circuit 56 supplied by the generator 2. The exciting winding 3 of the pilot regulator 54 is connected across the same circuit through a temperature compensation resistance 57. The piles 41 of the principal regulator are connected, in parallel with each other, in series with the aforesaid lamp circuit 56.

The principal regulator is mounted upon a bracket-like platform 58 with the carbon pile or piles 41, (as shown, two piles) supported upon it and the electro-magnetic system suspended beneath it. The electro-magnet 59 is of inverted U-shape with the winding or windings 55 disposed on the vertical limbs $59^1$. Disposed parallel to and in substantially the same horizontal plane with a line joining the pole faces 65 of said electro-magnet is a spindle 60 supported in brackets 61 dependent from the platform 58. The lower end of the brackets 61 are forked at $61^1$ and the spindle 60 is clamped between the fork parts by set screws $60^1$. A sleeve 62 mounted upon the spindle 60 has arms 63 integral with it and extending substantially horizontally to a flat plate-like armature 64 located beneath the pole-faces 65. An arm 66 of approximately the same length as the arms 63 and extending upwardly from the middle of the sleeve 62, with which it also is integral, carries a forked anchorage 67, adjustable by screw-means 68, for a tension spring 69. The latter extends substantially horizontally between the windings 55 of the electro-magnet to a fixed anchorage 70 at the back of the platform-bracket. A substantially shorter arm 71, i. e. of less than one half the length of the other arms 63, 66, extends substantially horizontally from the middle of the sleeve 62, with which it also is integral, and is pivotally connected to a pull rod 72 which passes vertically and freely through the forked anchorage 67 and the platform 58 to a point above the level of the tops of the carbon piles 41 which are located one on either side of or, if other than two in number, around the rod. The said rod 72, which may be provided, as shown, with a length-adjustment turnbuckle-device 46, presses upon the tops of the piles 41 through an equalizing bar 47 (or a spider), to which it is pivotally connected, and through temperature compensating means 50—53. A turnbuckle length-adjustment device and temperature compensating means suitable for the present purpose are described in the specification of United States Patent No. 1,963,825, aforesaid.

As will be appreciated, a carbon pile regulator such as has been described is relatively simple and inexpensive to manufacture, is robust in construction, and requires no expert knowledge for its maintenance and adjustment. The precision of regulation on the other hand is, in effect, provided by the pilot regulator 54 which is a relatively smaller piece of apparatus requiring little power for its operation and involving a small heat dissipation in its carbon pile 21.

Briefly the operation is as follows: Upon the lamp voltage tending to rise, the armature 7 of the pilot regulator is attracted and reduces the resistance of the pile 21 by compressing it. The excitation of the magnet 59 of the principal regulator is thereby increased and the resultant attraction of the armature 64 decompresses the piles 41 and increases their resistance and the attendant voltage drop. The voltage impressed upon the lamp, is thus maintained substantially constant.

Pilot controlled regulators wherein the magnet system compresses the pile and the spring decompresses the pile have the disadvantage that the pile is relatively loose when the magnet system is unexcited. Consequently the carbon discs are more liable to get broken and worn than in the case of the above described arrangement wherein the discs of the piles 41 are compressed firmly together by the spring 69 when the magnet system is unexcited, i. e. with the lamps 56 off in the instance of a lamp regulator. Any tendency for the regulator to be unstable when thus arranged is overcome by so proportioning the cross-section of the magnet system 59, 64 that its saturation is properly co-ordinated to the movement of the armature, i. e. that the effect of saturation commences to be appreciable at a relatively early stage in the movement of the armature towards the magnet (e. g. at a point between one quarter and one half of the armature movement). In this case, the effect of saturation is to prevent the attraction over the later part of the armature movement increasing at a rate too great to permit of its being matched against the spring resistance. Consequently there is no tendency for the magnet system to be unstable over the later part of the movement range.

I claim:
1. Electro-magnetic carbon-pile regulator, comprising a platform, a three-armed bell-crank lever mounted below said platform, an electromagnet mounted below said platform and having at its lower end a clapper-type armature carried upon a substantially horizontal arm of said lever, a carbon pile mounted above said platform, a pile-compressing member acting upon said pile, a pull-rod connecting said member with a short horizontal arm of said lever, and a tension spring acting upon a substantially vertical arm of said lever.

2. Electromagnetic carbon pile regulator comprising a support, an electromagnet mounted on one side thereof, a member having three arms pivotally mounted on the same side of said support, a clapper-type armature carried upon an arm of said member for cooperating with said electromagnet, a carbon pile mounted on the other side of said support, means to compress said pile, a pull rod connecting said means with another arm of said member, and a tension spring acting upon the third and remaining arm of said lever.

3. Electromagnetic carbon pile regulator comprising a support, a carbon pile mounted on said support, an armature pivoted on said support, an arm secured to said armature, a pull rod pivotally connected at one end to said lever and being operatively connected at its opposite end to said carbon pile, a second arm lying in the plane of said first-named arm and secured to said armature, a tension spring secured to said support and a link connecting said spring to said second-named arm, said link being divided to span said rod whereby to permit said rod and link to have relative movement.

A. J. S. BROWN.